(12) United States Patent
Miki et al.

(10) Patent No.: US 11,295,608 B2
(45) Date of Patent: Apr. 5, 2022

(54) TRAVEL STATUS RECORDING APPARATUS

(71) Applicant: DENSO TEN Limited, Kobe (JP)

(72) Inventors: Yoshikuni Miki, Kobe (JP); Hiroshi Yamada, Kobe (JP); Hiroyuki Watabe, Kobe (JP); Kimitaka Murashita, Kobe (JP); Yasutaka Okada, Kobe (JP); Ryusuke Seki, Kobe (JP)

(73) Assignee: DENSO TEN Limited, Kobe (JP)

( * ) Notice: Subject to any disclaimer, the term of this patent is extended or adjusted under 35 U.S.C. 154(b) by 87 days.

(21) Appl. No.: 17/008,764

(22) Filed: Sep. 1, 2020

(65) Prior Publication Data

US 2021/0065539 A1 Mar. 4, 2021

(30) Foreign Application Priority Data

Sep. 2, 2019 (JP) .............................. JP2019-159235

(51) Int. Cl.
*G06K 9/62* (2022.01)
*G08G 1/01* (2006.01)
*G06K 9/00* (2022.01)

(52) U.S. Cl.
CPC ............ *G08G 1/012* (2013.01); *G08G 1/0125* (2013.01); *G06K 9/00825* (2013.01); *G06K 9/00845* (2013.01)

(58) Field of Classification Search
CPC .. G08G 1/012; G08G 1/0125; G06K 9/00825; G06K 9/00845
See application file for complete search history.

(56) References Cited

FOREIGN PATENT DOCUMENTS

JP 2019-032725 A 2/2019

*Primary Examiner* — Mathew Franklin Gordon
(74) *Attorney, Agent, or Firm* — Oliff PLC

(57) ABSTRACT

In a travel status recording apparatus, a data acquisition unit acquires first travel status data and second travel status data indicating a travel status in relation to a vehicle. An event detection unit detects a predetermined event that occurs in relation to the vehicle based on the first travel status data acquired. In response to the predetermined event being detected, a data analysis unit analyzes the second travel status data using artificial intelligence. A recording control unit records, in a storage unit, an analysis result of the second travel status data in association with event detection information in relation to the predetermined event.

5 Claims, 9 Drawing Sheets

FIG. 6

EVENT DETECTION INFORMATION 21
(DETECTION OF FATIGUE OF DRIVER)

```
EVENT ID       : 123456
EVENT TYPE     : 4A (DETECTION OF FATIGUE)
DETECTION TIME : 2019/8/26 13:45:2
DETECTION      : N36 DEGREES 40 MINUTES XX SECONDS
POSITION         E135 DEGREES 10 MINUTES YY SECONDS
```

EVENT SUPPLEMENTARY INFORMATION 25A

```
SUPPLEMENTARY ID    : B52146
ANALYSIS TIME       : 2019/8/26 13:45:21
ASSOCIATED EVENT ID : 123456
ANALYSIS TARGET     : VEHICLE SPEED INFORMATION
ANALYSIS RESULT     : FATIGUE DEGREE : MEDIUM
                      DOZING : NO
```

EVENT SUPPLEMENTARY INFORMATION 25B

```
SUPPLEMENTARY ID    : B52147
ASSOCIATED EVENT ID : 123456
DETECTION TIME      : 2019/8/26 13:45:21
SUPPLEMENT TARGET   : STEERING OPERATION AMOUNT
ANALYSIS RESULT     : LEFT AND RIGHT WOBBLING
```

FIG. 7

ANALYSIS SETTING TABLE 50
(EVENT: SUDDEN DECELERATION)

| TARGET DATA | ANALYSIS CONTENT | USED DATA |
|---|---|---|
| VEHICLE INTERIOR IMAGE | • DETECT THAT DRIVER IS LOOKING ASIDE | Data5A |
| FRONT IMAGE | • DETECT RED SIGNAL<br>• DETECT YELLOW SIGNAL | Data5B |
| STEERING OPERATION AMOUNT | • OBSTACLE AVOIDANCE OPERATION | Data5C |
| TARGET INFORMATION (MILLIMETER WAVE RADAR) | • DETERMINE SUDDEN STOP OF FRONT VEHICLE | Data5D |

FIG. 8

EVENT DETECTION INFORMATION 24
(SUDDEN DECELERATION OF VEHICLE 1)

```
EVENT ID        : 321478
EVENT TYPE      : 5A
DETECTION TIME  : 2019/8/26 13:45:21
DETECTION       : N36 DEGREES 42 MINUTES XX SECONDS
POSITION          E135 DEGREES 8 MINUTES YY SECONDS
```

EVENT SUPPLEMENTARY INFORMATION 25P

```
SUPPLEMENTARY ID    : K49628
ANALYSIS TIME       : 2019/8/26 14:06:52
ASSOCIATED EVENT ID : 321478
ANALYSIS TARGET     : VEHICLE INTERIOR IMAGE
ANALYSIS RESULT     : DRIVER IS NOT LOOKING ASIDE
```

EVENT SUPPLEMENTARY INFORMATION 25Q

```
SUPPLEMENTARY ID    : K49629
ANALYSIS TIME       : 2019/8/26 14:06:52
ASSOCIATED EVENT ID : 321478
SUPPLEMENT TARGET   : FRONT IMAGE
ANALYSIS RESULT     : RED SIGNAL IS NOT DETECTED
                    : YELLOW SIGNAL IS NOT DETECTED
```

EVENT SUPPLEMENTARY INFORMATION 25R

```
SUPPLEMENTARY ID    : K49630
ANALYSIS TIME       : 2019/8/26 14:06:52
ASSOCIATED EVENT ID : 321478
ANALYSIS TARGET     : STEERING OPERATION AMOUNT
ANALYSIS RESULT     : OBSTACLE AVOIDANCE OPERATION
                      HAS BEEN DETECTED
```

EVENT SUPPLEMENTARY INFORMATION 25S

```
SUPPLEMENTARY ID    : K49631
ANALYSIS TIME       : 2019/8/26 14:06:52
ASSOCIATED EVENT ID : 321478
SUPPLEMENT TARGET   : VEHICLE SPEED INFORMATION AND
                      TARGET INFORMATION
ANALYSIS RESULT     : FRONT VEHICLE DOES NOT
                      SUDDENLY STOP
```

TRAVEL STATUS RECORDING APPARATUS

CROSS-REFERENCE TO RELATED APPLICATIONS

This application is based upon and claims the benefit of priority from prior Japanese patent application No. 2019-159235, filed on Sep. 2, 2019, the entire contents of which are incorporated herein by reference.

BACKGROUND

Technical Field

The present invention relates to a travel status recording apparatus mounted on a vehicle.

Related Art

In recent years, drive recorders have become widespread. The drive recorder is a travel status recording apparatus that records a captured image generated by a camera mounted on a vehicle. When the drive recorder is mounted on a truck, an operation manager of the truck may check whether a driver of the truck is driving the truck safely based on a captured image recorded in the drive recorder.

JP-A-2019-032725 discloses a drive recorder that detects a predetermined event which is sudden deceleration of a vehicle or the like. When a predetermined event has been detected, the drive recorder generates vehicle information indicating that the predetermined event occurs. The drive recorder compresses a moving image generated by a camera to generate low-resolution moving image data, and adds the vehicle information to a header of each frame included in the generated moving image data. The moving image data to which the vehicle information is added is transmitted to a server.

SUMMARY

When confirming the moving image data generated by the drive recorder according to Patent Literature 1, an operation manager specifies a time zone in which sudden braking occurs with reference to the vehicle information. The operation manager checks a traveling status of the truck using the moving image data in the specified time zone.

However, even when the operation manager refers to the vehicle information, the operation manager may only check whether sudden braking has occurred. It is not possible to specify a cause of sudden braking unless the operation manager views the moving image data at time ends before and after a time point at which the sudden braking occurs. That is, the related-art drive recorder has a problem that it takes time to check a travel status of a vehicle when a predetermined event occurs.

In view of the above, an object of the present invention is to provide a travel status recording apparatus capable of easily checking a travel status of a vehicle when a predetermined event occurs.

According to the first aspect of the invention, there is provided a travel status recording apparatus including: a data acquisition unit configured to acquire first travel status data and second travel status data, the first travel status data and the second travel status data indicating a travel status in relation to a vehicle; an event detection unit configured to detect a predetermined event that occurs in relation to the vehicle based on the first travel status data acquired by the data acquisition unit; a data analysis unit configured to analyze, in response to the predetermined event being detected by the event detection unit, the second travel status data acquired by the data acquisition unit using artificial intelligence; and a recording control unit configured to record, in a storage unit, an analysis result of the second travel status data obtained by the data analysis unit in association with event detection information in relation to the predetermined event detected by the event detection unit.

In a case where a predetermined event that occurs in a vehicle has been detected from the first travel status data, according to the first aspect, the second travel status data is analyzed using artificial intelligence and an analysis result is recorded. Therefore, according to the first aspect, it may be possible to easily check a travel status of a vehicle when a predetermined event occurs.

According to the second aspect of the invention, there is provided the travel status recording apparatus according to the first aspect including a transmission unit configured to transmit, in response to receiving a transmission request of the event detection information recorded in the storage unit from a communication device, the recorded event detection information and the analysis result associated with the recorded event detection information to the communication device.

According to the second aspect, it may be possible to easily acquire an analysis result associated with the recorded event detection information.

According to the third aspect of the invention, there is provided the travel status recording apparatus according to the first or second aspect, in which, in response to receiving event setting information including an event detection condition, the event detection unit may change an event detection condition based on the event detection information, and, in response to receiving analysis setting information indicating an analysis content of the second travel status data, the data analysis unit may change an analysis content of the second travel status data based on the analysis setting information.

According to the third aspect, it may be possible to easily change a detection condition of an event and an analysis content of the second travel status data.

According to a fourth aspect of the present invention, there is provided a travel status recording method including: acquiring first travel status data and second travel status data, the first travel status data and the second travel status data indicating a travel status in relation to a vehicle; detecting a predetermined event that occurs in relation to the vehicle based on the first travel status data acquired; analyzing, in response to the predetermined event being detected, the second travel status data acquired using artificial intelligence; and recording, in a storage unit, an analysis result of the acquired second travel status data in association with event detection information in relation to the predetermined event detected.

The fourth aspect is used in the first aspect.

According to the present invention, it may be possible to provide a travel status recording apparatus capable of easily checking a travel status of a vehicle when a predetermined event occurs.

BRIEF DESCRIPTION OF DRAWINGS

FIG. 6 shows an example of event supplementary information that is generated when sudden deceleration of a vehicle shown in FIG. 1 has been detected.

FIG. 7 shows another example of the analysis setting table set by the data analysis unit shown in FIG. 2.

FIG. 8 shows another example of the event supplementary information that is generated when sudden deceleration of the vehicle shown in FIG. 1 has been detected.

DETAILED DESCRIPTION

Figure 1:
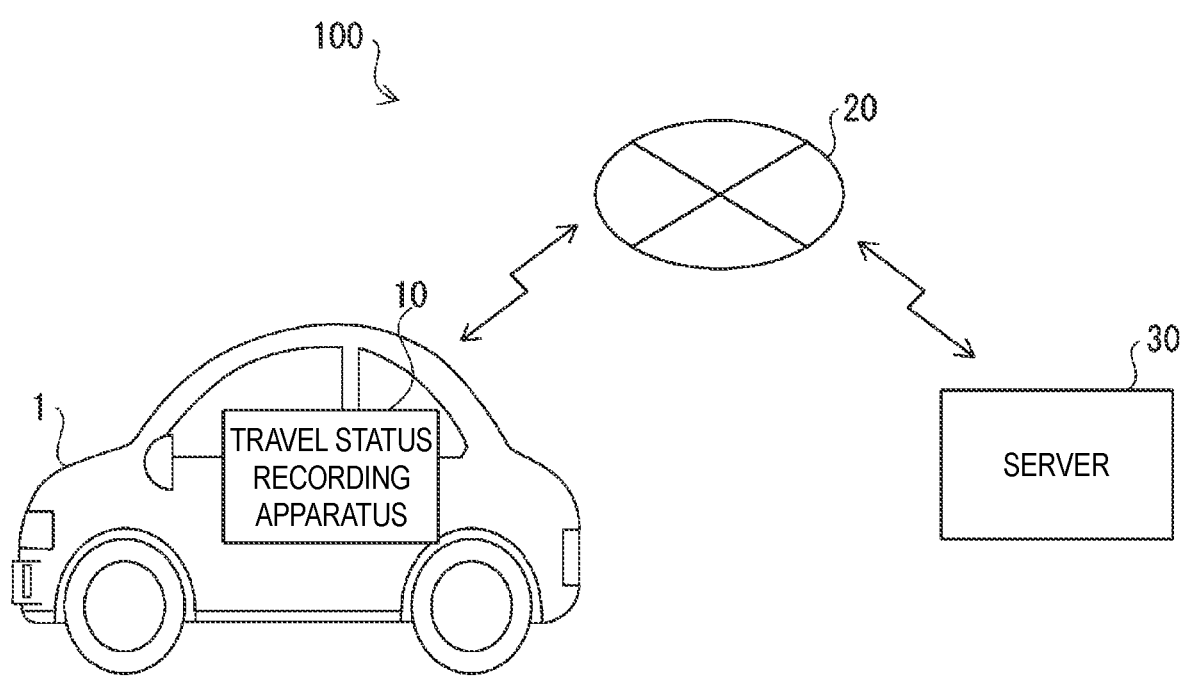
FIG. 1 is a functional block diagram showing a configuration of a travel status management system according to an embodiment of the present invention.

Hereinafter, embodiments of the present invention will be described in detail with reference to the drawings. In the drawings, the same or equivalent parts are denoted by the same reference numerals, and the description thereof will not be repeated.

[1. Configuration of Travel Status Management System 100]

FIG. 1 is a functional block diagram showing a configuration of a travel status management system 100 according to an embodiment. The travel status management system 100 includes a travel status recording apparatus 10, a network 20, and a server 30.

The travel status recording apparatus 10 is mounted on a vehicle 1 which is an automobile or the like, and is configured to record a travel status of the vehicle 1. The travel status recording apparatus 10 communicates with the server 30 via the network 20. In response to a request from the server 30, the travel status recording apparatus 10 transmits a recorded travel status of the vehicle 1 to the server 30.

The network 20 is a wide area network which is the Internet or the like. The travel status recording apparatus 10 accesses the network 20 using wireless communication. A wireless communication system is, for example, long term evolution (LTE) or a fifth generation mobile communication system.

The server 30 acquires a travel status of the vehicle 1 from the travel status recording apparatus 10 via the network 20, and stores the acquired travel status.

[2. Device Mounted on Vehicle 1]

Figure 2:
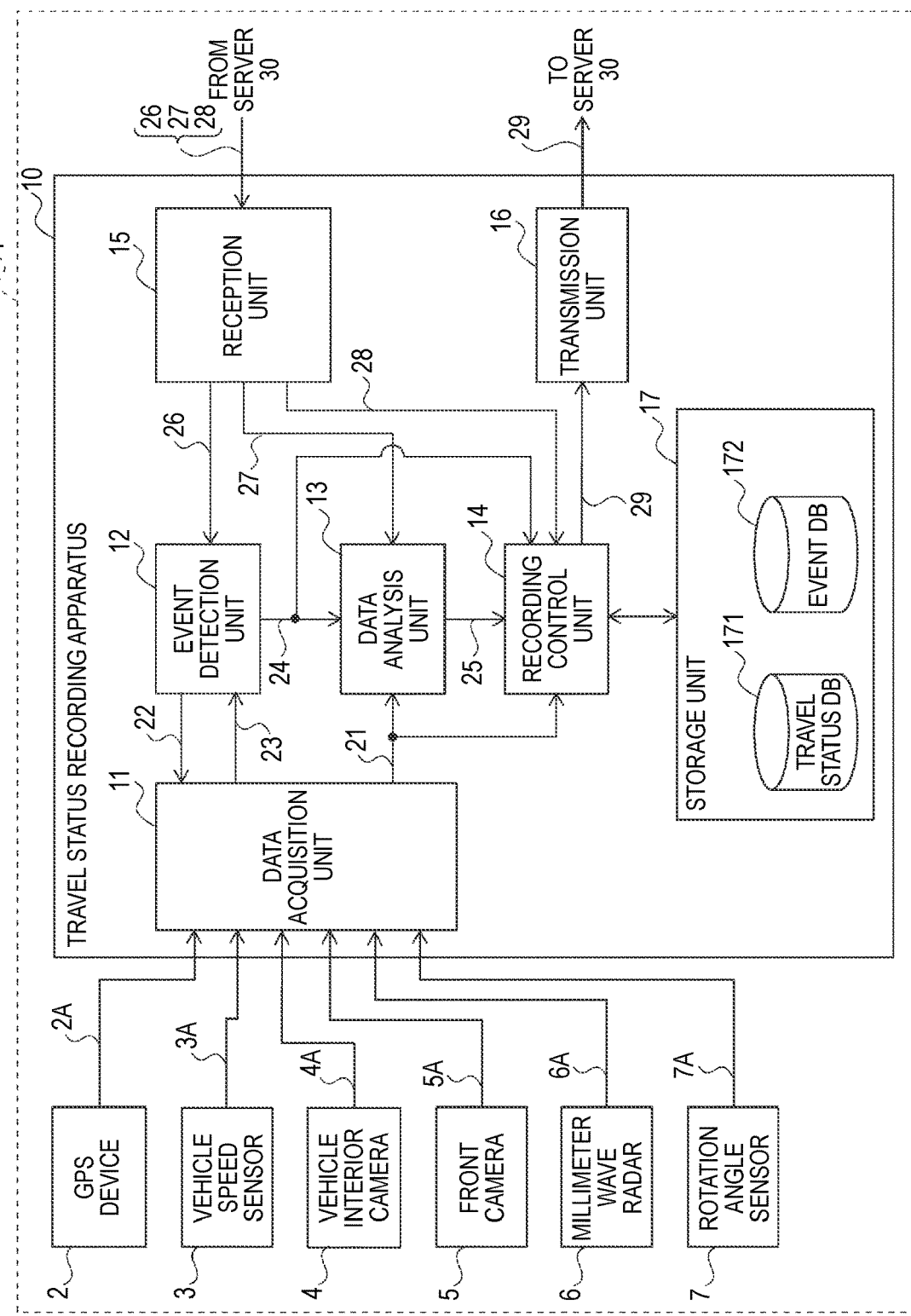
FIG. 2 is a functional block diagram showing a configuration of a travel status recording apparatus shown in FIG. 1.

FIG. 2 is a functional block diagram showing a configuration of the travel status recording apparatus 10 shown in FIG. 1. With reference to FIG. 2, the travel status recording apparatus 10 is configured to record output from various devices mounted on the vehicle 1 as travel status data indicating a travel status of the vehicle 1. The various devices acquire a travel status of the vehicle 1, and in the present embodiment, are a global positioning system (GPS) device 2, a vehicle speed sensor 3, a vehicle interior camera 4, a front camera 5, a millimeter wave radar 6, and a rotation angle sensor 7.

The GPS device 2 is configured to receive a signal from a GPS satellite, and to identify a current position 2A of the vehicle 1 based on the received signal. Each time identifying the current position 2A, the GPS device 2 outputs the identified current position 2A to a data acquisition unit 11 of the travel status recording apparatus 10.

The vehicle speed sensor 3 is configured to measure a rotation amount of a drive wheel of the vehicle 1 per unit time, and to output the measured rotation amount to the data acquisition unit 11 as vehicle speed information 3A.

The vehicle interior camera 4 is attached to, for example, a rearview mirror of the vehicle 1, and is configured to image a vehicle interior of the vehicle 1 including a driver seat. Therefore, the vehicle interior camera 4 images a driver of the vehicle 1 while the vehicle 1 is traveling. The vehicle interior camera 4 generates a vehicle interior image 4A and outputs the generated vehicle interior image 4A to the data acquisition unit 11. The vehicle interior image 4A is a frame of a moving image.

The front camera 5 is attached to, for example, a front end surface of the vehicle 1, and is configured to image a scene in front of the vehicle 1 to generate a front image 5A. A mounting position of the front camera 5 is not limited as long as the front camera 5 may image a scene in front of the vehicle 1. The front camera 5 outputs the front image 5A to the data acquisition unit 11. The front image 5A is a frame of a moving image.

The millimeter wave radar 6 is attached to the front end surface of the vehicle 1 and is configured to detect a target in front of the vehicle 1. The millimeter wave radar 6 generates target information 6A as a detection result of a target, and outputs the generated target information 6A to the data acquisition unit 11. The target information 6A includes a position, a distance, and a relative speed of the detected target.

The rotation angle sensor 7 is configured to detect a rotation amount of a steering wheel (not shown) of the vehicle 1, and to output the detected rotation amount to the data acquisition unit 11 as a steering operation amount 7A.

[3. Configuration of Travel Status Recording Apparatus 10]

With reference to FIG. 2, the travel status recording apparatus 10 includes the data acquisition unit 11, an event detection unit 12, a data analysis unit 13, a recording control unit 14, a reception unit 15, a transmission unit 16, and a storage unit 17.

The data acquisition unit 11 is configured to acquire the current position 2A, the vehicle speed information 3A, the vehicle interior image 4A, the front image 5A, the target information 6A, and the steering operation amount 7A from various devices mounted on the vehicle 1 as travel status data 21. The data acquisition unit 11 outputs the acquired travel status data 21 to the data analysis unit 13 and the recording control unit 14.

The data acquisition unit 11 receives designation information 22 from the event detection unit 12. The designation information 22 is used for specifying at least one piece of the travel status data 21 acquired by the data acquisition unit 11. The data acquisition unit 11 outputs data corresponding to the received designation information 22 of the travel status data 21 to the event detection unit 12 as designated travel status data 23.

The event detection unit 12 outputs the designation information 22 to the data acquisition unit 11, and receives the designated travel status data 23 from the data acquisition unit 11. The event detection unit 12 is configured to detect an event from the designated travel status data 23 received from the data acquisition unit 11 using artificial intelligence. The event is a specific travel status that occurs in the vehicle 1, for example, sudden deceleration of the vehicle 1 or fatigue of a driver. The event detection unit 12 outputs event detection information 24 indicating a detection result of an event to the data analysis unit 13 and the recording control unit 14.

When receiving event setting information 26 from the reception unit 15, the event detection unit 12 changes a type of an event to be detected and an event detection condition based on the received event setting information 26. When the type of an event to be detected is changed, the event detection unit 12 transmits the designation information 22 to the data acquisition unit 11, and instructs the data acquisition unit 11 to change the designated travel status data 23.

The data analysis unit 13 is configured to analyze each piece of the travel status data 21 received from the data acquisition unit 11 using artificial intelligence when receiving the event detection information 24 from the event detection unit 12. A content of the analysis using artificial intelligence differs depending on a content of an event indicated by the event detection information 24. The data analysis unit 13 analyzes the travel status data 21 to extract data satisfying a predetermined condition from the travel status data 21.

For example, when the event detection information 24 indicates sudden deceleration of the vehicle 1, the data analysis unit 13 executes image recognition processing for detecting a red signal from the front image 5A. For example, artificial intelligence which is a neural network, a support vector machine, or the like is used to detect a red signal. When a red signal has been detected from the front image 5A, the data analysis unit 13 generates event supplementary information 25 indicating that the red signal has been detected from the front image 5A. The event supplementary information 25 is associated with the event detection information 24 received from the event detection unit 12 and is output to the recording control unit 14.

When receiving analysis setting information 27 from the reception unit 15, the data analysis unit 13 changes an analysis content of the travel status data 21 based on the received analysis setting information 27.

The recording control unit 14 is configured to record various types of information in a database provided in the storage unit 17. Specifically, the recording control unit 14 receives the travel status data 21 from the data acquisition unit 11, and records the received travel status data 21 in a travel status database (DB) 171 provided in the storage unit 17.

The recording control unit 14 receives the event detection information 24 from the event detection unit 12, and receives the event supplementary information 25 from the data analysis unit 13. The recording control unit 14 records the received event detection information 24 and the received event supplementary information 25 in an event DB 172 provided in the storage unit 17.

When receiving a transmission request 28 issued by the server 30 from the reception unit 15, the recording control unit 14 reads out the event detection information 24 designated by the received transmission request 28 from the event DB 172. The recording control unit 14 reads out the event supplementary information 25 associated with the read event detection information 24 from the event DB 172. The recording control unit 14 generates response data 29 including the read event detection information 24 and the read event supplementary information 25, and outputs the generated response data 29 to the transmission unit 16.

The reception unit 15 is configured to receive the event setting information 26, the analysis setting information 27, and the transmission request 28 from the server 30. When receiving the event setting information 26, the reception unit 15 outputs the received event setting information 26 to the event detection unit 12. When receiving the analysis setting information 27, the reception unit 15 outputs the received analysis setting information 27 to the data analysis unit 13. When receiving the transmission request 28, the reception unit 15 outputs the received transmission request 28 to the recording control unit 14.

The transmission unit 16 is configured to transmit the received response data 29 to the server 30 when receiving the response data 29 from the recording control unit 14.

[4. Operation]
[4.1. Setting of Operation Condition]

Figure 3:
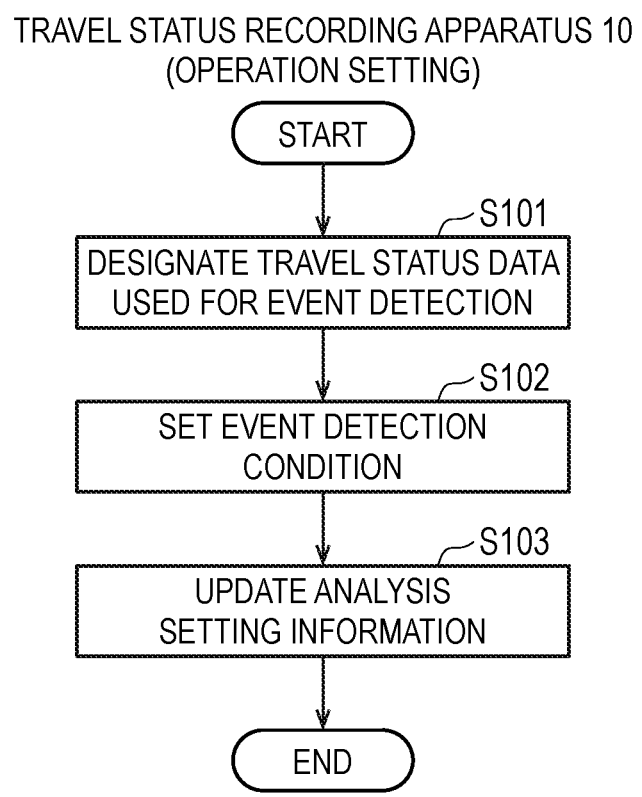
FIG. 3 is a flowchart showing operation of the travel status recording apparatus shown in FIG. 1 at a time of setting operation.

FIG. 3 is a flowchart showing operation of the travel status recording apparatus 10 shown in FIG. 1 at a time of setting an operation condition. In FIG. 3, steps S101 to S102 are processing related to a setting of event detection. Step S103 is processing related to a setting of analysis of the travel status data 21. In the present embodiment, the server 30 transmits the event setting information 26 and the analysis setting information 27 to the travel status recording apparatus 10 in response to an instruction from an operator.

When receiving the event setting information 26 and the analysis setting information 27 from the server 30, the travel status recording apparatus 10 starts the processing shown in FIG. 3. The reception unit 15 outputs the event setting information 26 received from the server 30 to the event detection unit 12, and outputs the analysis setting information 27 received from the server 30 to the data analysis unit 13.

(Setting of Event Detection Unit 12)

The event detection unit 12 designates travel status data used for event detection based on the event setting information 26 received from the reception unit 15 (step S101).

For example, when the event setting information 26 indicates that fatigue of a driver is detected as an event, the event setting information 26 includes the designation information 22 for designating the vehicle interior image 4A. The event detection unit 12 outputs the designation information 22 included in the event setting information 26 to the data acquisition unit 11. Accordingly, the vehicle interior image 4A is designated as designated travel status data used to detect fatigue of a driver.

When the event setting information 26 indicates that sudden deceleration of the vehicle 1 is detected as an event, the event setting information 26 includes the designation information 22 for designating the vehicle speed information 3A. The event detection unit 12 outputs the designation information 22 for designating the vehicle speed information 3A to the data acquisition unit 11. Accordingly, the vehicle speed information 3A is designated as the designated travel status data 23 used to detect sudden deceleration of the vehicle 1.

The event detection unit 12 sets an event detection condition based on the event setting information 26 received from the reception unit 15 (step S102).

For example, when detecting fatigue of a driver, the event detection unit 12 inputs a window image cut out from the vehicle interior image 4A to a neural network, and determines whether the driver is tired based on output from the neural network. The neural network is a type of artificial intelligence. Therefore, when instructing to detect sudden deceleration of the vehicle 1 as an event, the event setting information 26 includes various parameters related to the neural network which are a weighting coefficient of numerical data input to each node of the neural network, an activation function, and the like. The event detection unit 12 sets a neural network used for detection of fatigue of a driver according to the event setting information 26.

(Setting of Data Analysis Unit 13)

Based on the analysis setting information 27 received from the reception unit 15, the data analysis unit 13 sets operation when each piece of the travel status data 21 is analyzed (step S103). For example, when the analysis setting information 27 is used for setting an analysis content at a time of detection of fatigue of a driver, the data analysis unit 13 updates a table shown in FIG. 4 based on the analysis setting information 27.

Figure 4:
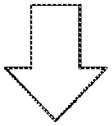
FIG. 4 shows an example of an analysis setting table set by a data analysis unit shown in FIG. 2.

An analysis setting table 40 shown in FIG. 4 shows an analysis content of the travel status data 21 that is executed when fatigue of a driver has been detected as an event. An analysis content when sudden deceleration of the vehicle 1 has been detected as an event will be described later.

In the analysis setting table 40 shown in FIG. 4, target data indicates the travel status data 21 that is analyzed when fatigue of a driver has been detected as an event. When fatigue of a driver has been detected as an event, it may be seen that the vehicle speed information 3A is used for data analysis.

The analysis content indicates a specific pattern detected by analyzing target data. For example, when fatigue of a driver has been detected as an event, the data analysis unit 13 analyzes the vehicle speed information 3A and detects a pattern of a vehicle speed change corresponding to a fatigue degree and a pattern of a vehicle speed change generated during dozing driving. Three types of the patterns of a vehicle speed change each correspond to a respective one of fatigue degrees "low", "medium", and "high".

A storage destination is a path indicating a storage destination of setting data that is used when the data analysis unit 13 analyzes target data. When the data analysis unit 13 uses a neural network to analyze target data, the setting data includes various parameters related to the neural network which are a weighting coefficient of numerical data input to each node of the neural network, an activation function, and the like.

Through step S103, a content of data analysis at a time of event detection is changed. For example, it is assumed that the analysis setting information 27 indicates addition of analysis of the steering operation amount 7A as data analysis that is executed when fatigue of a driver has been detected as an event. The data analysis unit 13 adds a record 42 to the analysis setting table 40, records the "steering operation amount" in a column of target data of the added record 42, and records a "change in steering operation amount corresponding to a fatigue degree" as an analysis content. The data analysis unit 13 extracts setting data from the analysis setting information 27, and stores the extracted setting data in the storage unit 17. The data analysis unit 13 records a storage destination of the stored setting data in a column of a storage destination of the record 42.

In step S103, the data analysis unit 13 may delete a record recorded in the analysis setting table 40, or may partially change an analysis content in the record 41. For example, the data analysis unit 13 may delete a "speed change in dozing driving" in the analysis content in the record 41. In this case, when analyzing the vehicle speed information 3A, the data analysis unit 13 does not detect a pattern of a speed change in dozing driving.

In this way, the travel status recording apparatus 10 changes a detection condition of an event that occurs in the vehicle 1 based on the event setting information 26 transmitted from the server 30. The travel status recording apparatus 10 changes an analysis content at a time of event detection based on the analysis setting information 27 transmitted from the server 20. Accordingly, it is possible to easily change a detection condition of the event and an analysis content.

[4.2. Recording of Travel Status Data 21]

Figure 5:
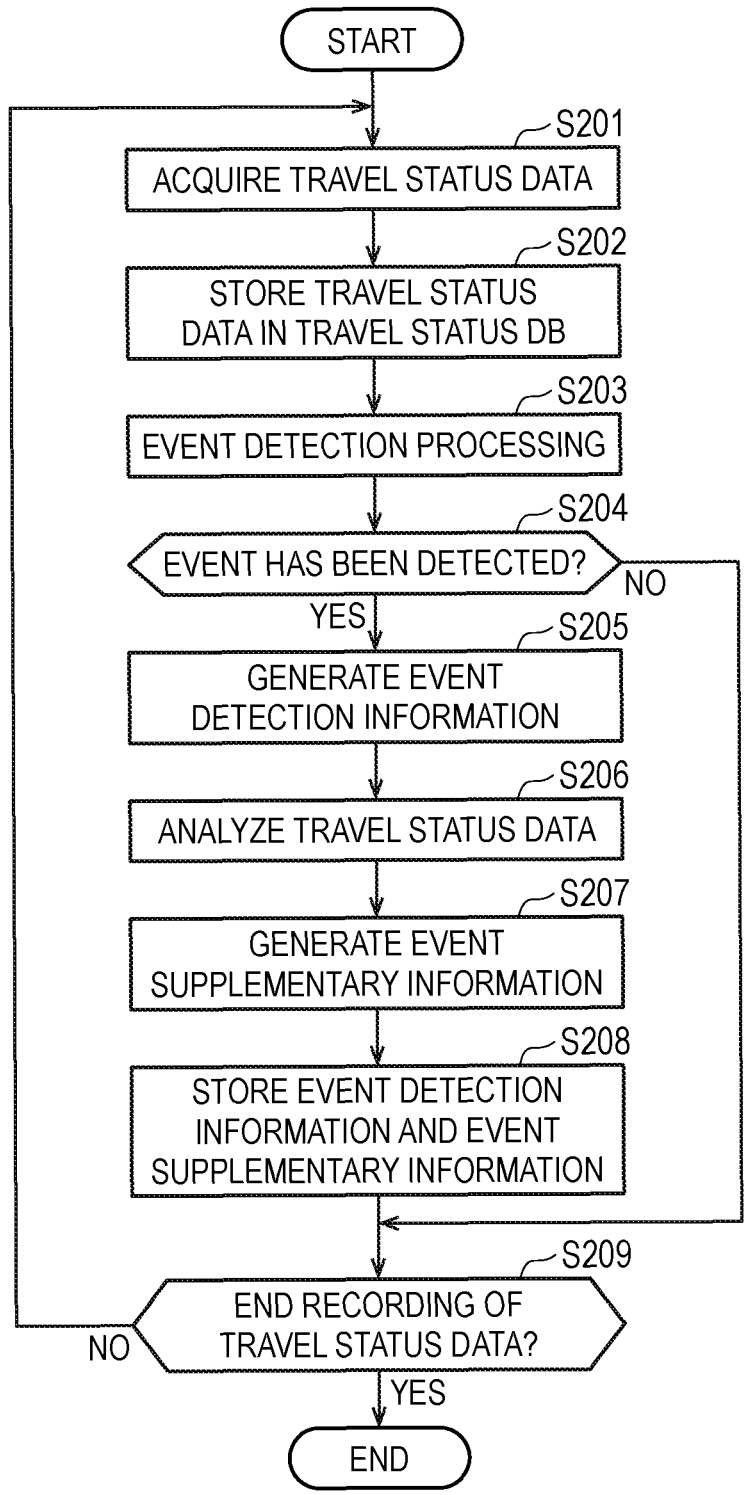
FIG. 5 is a flowchart showing operation of recording travel status data by the travel status recording apparatus shown in FIG. 1.

FIG. 5 is a flowchart showing operation when the travel status recording apparatus 10 shown in FIG. 1 records the travel status data 21. As shown in FIG. 5, the travel status recording apparatus 10 detects an event that occurs in the vehicle 1 in parallel with recording of the travel status data 21.

Hereinafter, operation of the travel status recording apparatus 10 configured to record the travel status data 21 will be described separately when the travel status recording apparatus 10 detects the following two events. The two events are (1) fatigue of a driver and (2) sudden deceleration of the vehicle 1.

[4.2.1. Case in which Fatigue of Driver has been Detected]

Operation of the travel status recording apparatus 10 that detects fatigue of a driver as an event will be described by taking a case in which the analysis setting table 40 shown in FIG. 4 includes the records 41, 42 as an example. When an ignition switch (not shown) of the vehicle 1 is turned on, the travel status recording apparatus 10 starts processing shown in FIG. 5.

With reference to FIG. 5, the data acquisition unit 11 acquires the travel status data 21 from various devices mounted on the vehicle 1 (step S201). Timings at which the data acquisition unit 11 acquires the current position 2A, the vehicle speed information 3A, the vehicle interior image 4A, the front image 5A, the target information 6A, and the steering operation amount 7A may be the same or different.

The data acquisition unit 11 outputs the travel status data 21 acquired in step S201 to the recording control unit 14. The recording control unit 14 records the travel status data 21 received from the data acquisition unit 11 in the travel status DB 171 (step S202). The data acquisition unit 11 outputs the vehicle interior image 4A designated by the designation information 22 in the travel status data 21 acquired in step S101 to the event detection unit 12 as the designated travel status data 23.

The event detection unit 12 detects an event from the designated travel status data 23 received from the data acquisition unit 11 (step S203). Specifically, the event detection unit 12 specifies a region including a face of a driver of the vehicle 1 in the vehicle interior image 4A, and cuts out an image in the specified region as a window image. The event detection unit 12 determines whether the driver of the vehicle 1 is tired using the cut out window image. A plurality of window images may be cut out.

More specifically, the event detection unit 12 inputs the window image cut out from the vehicle interior image 4A to a neural network that has learned a face of a person whose eyes are closed. The event detection unit 12 determines whether the driver of the vehicle 1 has closed eyes based on output of the neural network. The event detection unit 12 specifies the number of blinks of the driver per unit time (for example, 10 seconds) based on a determination result as to whether the driver has closed the eyes. The event detection unit 12 uses artificial intelligence to determine whether the driver is tired based on a temporal change in the number of blinks of the driver.

When the event detection unit 12 has not detected fatigue of the driver (No in step S204), the processing proceeds to step S209 (described later).

When fatigue of the driver has been detected (Yes in step S204), the event detection unit 12 generates the event detection information 24 indicating that fatigue of the driver has been detected (step S205). The event detection unit 12 outputs the generated event detection information 24 to the data analysis unit 13 and the recording control unit 14.

FIG. 6 shows an example of the event detection information 24 and the event supplementary information 25 that are generated by the travel status recording apparatus 10 shown in FIG. 1. When fatigue of the driver has been detected, the event detection unit 12 generates the event detection information 24 shown in FIG. 6.

With reference to FIG. 6, the event detection information 24 includes an event ID, an event type, a detection time, and a detection position. The event ID is identification information uniquely assigned to the event detection information 24. The event type is information for specifying a detected event. As described above, when fatigue of the driver has been detected, the event type is "4A". The detection time is a time at which the event detection unit 12 detects an event. The detection position indicates a position at which an event is detected, and is described based on position information 2A.

Referring again to FIG. 5, when receiving the event detection information 24 from the event detection unit 12, the data analysis unit 13 analyzes the travel status data 21 based on the received event detection information 24 (step S206). As a result of step S206, at least one piece of the event supplementary information 25 is generated. The data analysis unit 13 outputs the generated at least one piece of the event supplementary information 25 to the recording control unit 14.

Step S206 will be described in detail. When an event type recorded in the event detection information 24 is "4A" shown in FIG. 6, the data analysis unit 13 determines analysis of the vehicle speed information 3A and the steering operation amount 7A with reference to the updated analysis setting table 40 shown in FIG. 4. The data analysis unit 13 reads setting data from the storage unit 17 according to a storage destination recorded in each of the records 41, 42, and changes a neural network using the read setting data. The data analysis unit 13 analyzes each of the vehicle speed information 3A and the steering operation amount 7A using the changed neural network. In the analysis of the vehicle speed information 3A and the analysis of the steering operation amount 7A, different neural networks are used.

The data analysis unit 13 generates the event supplementary information 25 in which an analysis result of the travel status data 21 is recorded (step S207).

For example, when fatigue of the driver has been detected as an event, the data analysis unit 13 generates event supplementary information 25A, 25B shown in FIG. 6. With reference to FIG. 6, the event supplementary information 25A is an analysis result of the vehicle speed information 3A, and includes a supplementary ID, an analysis time, an associated event ID, an analysis target, and an analysis result. The supplementary ID is unique identification information assigned to the event supplementary information 25A. The analysis time is a time at which the data analysis unit 13 starts analysis of the travel status data 21.

The associated event ID is an event ID of the event detection information 24 corresponding to the event supplementary information 25A. The associated event ID in the event supplementary information 25A matches an event ID in the event detection information 24 shown in FIG. 6. Therefore, it may be seen that the event supplementary information 25A is associated with the event detection information 24 shown in FIG. 6.

The analysis target indicates travel status data analyzed by the data analysis unit 13. The event supplementary information 25A records an analysis result of the vehicle speed information 3A. The analysis result shows a result of analysis of the travel status data 21. The analysis result recorded in the event supplementary information 25A indicates that a fatigue degree of the driver is "medium" and that the driver is not dozing.

The event supplementary information 25B records an analysis result of the steering operation amount 7A. Differences of the event supplementary information 25B from the event supplementary information 25A will be described below. In the event supplementary information 25B, the analysis result is recorded as "left and right wobbling". Therefore, the event supplementary information 25B indicates that left and right wobbling of the vehicle 1 is detected as fatigue of the driver is detected.

Referring again to FIG. 5, the recording control unit 14 records the event detection information 24 generated in step S205 and the event supplementary information 25 generated in step S207 in the event DB 172 (step S208).

After step S208, the travel status recording apparatus 10 determines whether to end the recording of the travel status data 21 (step S209). For example, when the ignition switch of the vehicle 1 is turned off, the travel status recording apparatus 10 determines to end the recording of the travel status data 21 (Yes in step S209), and ends the processing shown in FIG. 5. When the ignition switch of the vehicle 1 is on, the travel status recording apparatus 10 determines to continue the recording of the travel status data 21 (No in step S209), and the processing returns to step S201.

In this way, when fatigue of the driver of the vehicle 1 has been detected as an event, the travel status recording apparatus 10 analyzes the vehicle speed information 3A and the steering operation amount 7A, and records analysis results thereof in the event supplementary information 25A, 25B. Accordingly, by referring to the event supplementary information 25A, 25B, it is possible to easily check a travel status of the vehicle 1 when fatigue of the driver has been detected.

[4.2.2. Case in which Sudden Deceleration of Vehicle 1 has been Detected]

FIG. 7 is a table showing an analysis content of the travel status data 21 that is executed when sudden deceleration of the vehicle 1 has been detected as an event. When sudden deceleration of the vehicle 1 has been detected as an event, the data analysis unit 13 analyzes the vehicle interior image 4A, the front image 5A, the target information 6A, and the steering operation amount 7A based on an analysis setting table 50 shown in FIG. 7.

Hereinafter, operation of the travel status recording apparatus 10 when sudden deceleration of the vehicle 1 has been detected as an event will be described. Steps S201 to S202 have already been described in operation of the travel status recording apparatus 10 when fatigue of the driver has been detected as an event, and a description thereof will be omitted.

The data acquisition unit 11 outputs the vehicle speed information 3A to the event detection unit 12 as the designated travel status data 23. The event detection unit 12 executes event detection processing using the vehicle speed information 3A received from the data acquisition unit 11 (step S203). Specifically, the event detection unit 12 determines whether the vehicle 1 has suddenly decelerated based on a temporal change of the vehicle speed information 3A. Similar to detection of fatigue of the driver, the event detection unit 12 determines whether the vehicle 1 has suddenly decelerated using artificial intelligence which is a neural network or the like.

When sudden deceleration of the vehicle 1 has been detected (Yes in step S204), the event detection unit 12 generates the event detection information 24 indicating that sudden deceleration of the vehicle 1 has been detected (step S205). The event detection unit 12 outputs the generated event detection information 24 to the data analysis unit 13 and the recording control unit 14.

FIG. 8 shows an example of the event detection information 24 and the event supplementary information 25 that are generated when sudden deceleration of the vehicle 1 has been detected as an event. In the event detection information 24 shown in FIG. 8, a event type is "5A" indicating sudden deceleration of the vehicle 1. An event ID, a detection time, and a detection position when sudden deceleration of the vehicle 1 has been detected as an event are the same as those when fatigue of the driver has been detected as an event.

With reference to FIG. 5, when receiving the event detection information 24 indicating that sudden deceleration of the vehicle 1 has been detected, the data analysis unit 13 analyzes the travel status data 21 based on the analysis setting table 50 (step S206). An analysis content when sudden deceleration of the vehicle 1 has been detected will be specifically described with reference to the analysis setting table 50 shown in FIG. 7.

When sudden deceleration of the vehicle 1 has been detected as an event, the data analysis unit 13 determines whether the driver is looking aside by analyzing the vehicle interior image 4A using artificial intelligence. When the driver is looking aside, the driver may notice later that a distance from the vehicle 1 to a front vehicle is shortened. The front vehicle travels in a lane in which the vehicle 1 travels and is in front of the vehicle 1. Based on a determination result as to whether the driver is looking aside, it is easy to identify a cause of sudden deceleration of the vehicle 1.

The data analysis unit 13 detects each of a red signal and a yellow signal from the front image 5A using artificial intelligence. If being late to notice a yellow signal or a red signal, the driver may apply sudden braking. By the data analysis unit 13 detecting a red signal or a yellow signal, it is easy to identify a cause of sudden deceleration of the vehicle 1.

The data analysis unit 13 uses artificial intelligence to detect obstacle avoidance operation using the steering wheel from the steering operation amount 7A. If an obstacle is on a road, the driver may suddenly brake the vehicle 1 and sharply turn the vehicle 1 so as to avoid the obstacle. When obstacle avoidance operation has been detected along with sudden deceleration, it may be inferred that the driver has sharply turned the vehicle 1 so as to avoid the obstacle.

The data analysis unit 13 uses artificial intelligence to determine whether a front vehicle has suddenly decelerated using the vehicle speed information 3A and the target information 6A. The target information 6A includes a position, a distance, and a relative speed of a target in front of the vehicle 1. Therefore, the data analysis unit 13 may determine whether a front vehicle has suddenly decelerated based on the vehicle speed information 3A and the target information 6A. If the front vehicle has suddenly decelerated, it may be inferred that sudden deceleration of the vehicle 1 is due to the sudden deceleration of the front vehicle.

In this way, by the data analysis unit 13 analyzing the travel status data 21 based on the analysis setting table 50 shown in FIG. 7, it becomes easy to identify a travel status of the vehicle 1 when sudden deceleration of the vehicle 1 has been detected.

With reference to FIG. 5, the data analysis unit 13 generates the event supplementary information 25 as a result of data analysis accompanying detection of sudden deceleration of the vehicle 1 (step S207). When sudden deceleration of the vehicle 1 has been detected as an event, the data analysis unit 13 generates event supplementary information 25P to 25S shown in FIG. 8.

Items in each piece of the event supplementary information 25P to 25S are the same as items in the event supplementary information 25A, 25B shown in FIG. 6. The event supplementary information 25P to 25S is associated with the event detection information 24 shown in FIG. 8. This is because associated event IDs recorded in the event supplementary information 25P to 25S are the same as an event ID recorded in the event detection information 24 shown in FIG. 8.

With reference to FIG. 8, the event supplementary information 25P records an analysis result of the vehicle interior image 4A, and a fact that the driver is not looking aside is recorded as the analysis result. The event supplementary information 25Q is an analysis result of the front image 5A, and records that neither a yellow signal nor a red signal has been detected. The event supplementary information 25S is an analysis result of the target information 6A, and records that sudden deceleration of a front vehicle has not been detected.

The event supplementary information 25R is an analysis result of the steering operation amount 7A, and records that obstacle avoidance operation has been detected. Therefore, it may be estimated that a cause of sudden deceleration of the vehicle 1 is an obstacle left on a road surface.

[4.3. Transmission of Event Detection Information 24]

The server 30 acquires the event detection information 24 and the event supplementary information 25 that are generated by the travel status recording apparatus 10 from the travel status recording apparatus 10 in response to operation by an operator. This will be described in detail below.

For example, when the operator instructs the server 30 to acquire the event detection information 24 in which sudden deceleration of the vehicle 1 is recorded, the server 30 transmits the transmission request 28 for requesting transmission of the event detection information 24 whose event type is "5A" to the travel status recording apparatus 10.

When the travel status recording apparatus 10 has received the transmission request 28 from the server 30, the recording control unit 14 searches the event DB 172 for the event detection information 24 corresponding to the event type "5A" included in the received transmission request 28. The recording control unit 14 searches the event DB 172 for the event supplementary information 25A associated with the searched event detection information 24. The recording control unit 14 generates the response data 29 including the searched event detection information 24 and the searched event supplementary information 25. The transmission unit 16 is configured to transmit the response data 29 generated by the recording control unit 14 to the server 30.

In this way, the operator designates an event that may be detected in the vehicle 1, and requests the travel status recording apparatus 10 to transmit the event detection information 24 in which the designated event has been recorded. The travel status recording apparatus 10 transmits the requested event detection information 24 corresponding to the event and the event supplementary information 25 associated with this event detection information 24 to the server 30. Accordingly, in a case in which a specific event occurs in the vehicle 1, the operator may easily check a travel status of the vehicle 1 when the specific event occurs.

[Modification]

In the above-described embodiment, an example has been described in which the vehicle 1 is mounted with the vehicle interior camera 4 and the front camera 5. However, the present invention is not limited thereto. The vehicle 1 may be mounted with a camera other than the vehicle interior camera 4 and the front camera 5. For example, the vehicle 1 may be mounted with a right side camera, a left side camera, and a rear camera. The right side camera is provided on a right door mirror of the vehicle 1. The left side camera is provided on a left door mirror of the vehicle 1. The rear camera is provided on a rear end surface of the vehicle 1. When sudden deceleration of the vehicle 1 has been detected, the data analysis unit 13 may detect an object (a pedestrian, a bicycle, or the like) to be detected from captured images generated by the right side camera, the left side camera, and the rear camera.

In the above-described embodiment, as an example of an event to be detected by the travel status recording apparatus 10, fatigue of a driver and sudden deceleration of the vehicle 1 have been described. However, the present invention is not limited thereto. An event to be detected by the event detection unit 12 is not particularly limited. The event detection unit 12 may determine that an event has been detected when data satisfying a predetermined condition is detected from at least one piece of the travel status data 21.

For example, when determining that the current position 2A of the vehicle 1 is within a preset region, the event detection unit 12 may determine that an event has been detected. The preset region may be, for example, a circular region around a point where traffic accidents frequently occur, or may be a highway.

If the data analysis unit 13 executes analysis corresponding to a detected event, an analysis content of the travel status data 21 is not particularly limited. For example, when determining that the vehicle 1 is traveling on a highway, the event detection unit 12 may analyze the vehicle speed information 3A and the steering operation amount 7A to determine whether driving is being performed in a slanted manner.

In the above-described embodiment, functional blocks of the travel status recording apparatus 10 may be individually formed into one chip by a semiconductor device which is an LSI or the like, or may be formed into one chip so as to include a part or all of the functional blocks. The name used here is LSI, but it may also be referred to as an IC, a system LSI, a super LSI, or an ultra LSI depending on a degree of integration.

A method of circuit integration is not limited to the LSI, and may be implemented by a dedicated circuit or a general-purpose processor. After the LSI is manufactured, a field programmable gate array (FPGA) that may be programmed or a reconfigurable processor that may reconfigure a connection and a setting of circuit cells in the LSI may be used.

A part or all of processing executed by the travel status recording apparatus 10 may be implemented by a program. Then, a part or all of the processing of functional blocks according to the above-described embodiment is executed by a central processing unit (CPU) in a computer. A program for performing each piece of processing is stored in a storage device which is a hard disk, a ROM, or the like, and is read out and executed in the ROM or a RAM.

Each piece of the processing according to the above-described embodiment may be implemented by hardware, or may be implemented by software (including a case in which the processing is implemented together with an operating system (OS), middleware, or a predetermined library). Further, the processing may be implemented by a combination of software and hardware.

Figure 9:
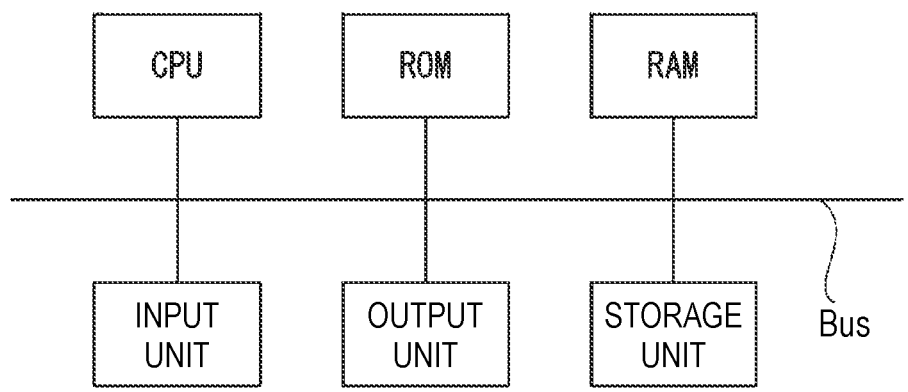
FIG. 9 shows a configuration of a CPU bus.

For example, in a case in which each functional block of the travel status recording apparatus 10 is implemented by software, each functional unit may be implemented by software processing using a hardware configuration (a hardware configuration in which a CPU, a ROM, a RAM, an input unit, an output unit, and the like are connected by a Bus) shown in FIG. 9.

Order of execution of the processing method according to the above-described embodiment is not limited to the description of the above-described embodiment, and the order of execution may be changed without departing from the scope of the invention.

A computer program for causing a computer to execute the above-described method and a computer-readable recording medium storing the program are included in the scope of the present invention. Here, examples of the computer-readable recording medium include a flexible disk, a hard disk, a CD-ROM, a MO, a DVD, a DVD-ROM, a DVD-RAM, a large-capacity DVD, a next-generation DVD and a semiconductor memory.

Although the embodiment of the present invention has been described above, the above-described embodiment is merely an example for implementing the present invention. Therefore, the present invention is not limited to the above-described embodiment, and may be implemented by appropriately modifying the above-described embodiment without departing from the scope of the invention.

What is claimed is:

1. A travel status recording apparatus comprising:
   a data acquisition unit configured to acquire first travel status data and second travel status data, the first travel status data and the second travel status data indicating a travel status in relation to a vehicle;
   an event detection unit configured to detect a predetermined event that occurs in relation to the vehicle based on the first travel status data acquired by the data acquisition unit;
   a data analysis unit configured to analyze, in response to the predetermined event being detected by the event detection unit, the second travel status data acquired by the data acquisition unit using artificial intelligence; and
   a recording control unit configured to record, in a storage unit, an analysis result of the second travel status data obtained by the data analysis unit in association with event detection information in relation to the predetermined event detected by the event detection unit.

2. The travel status recording apparatus according to claim 1, further comprising
   a transmission unit configured to transmit, in response to receiving a transmission request of the event detection information recorded in the storage unit from a communication device, the recorded event detection information and the analysis result associated with the recorded event detection information to the communication device.

3. The travel status recording apparatus according to claim 1, wherein,
   in response to receiving event setting information including an event detection condition, the event detection unit changes an event detection condition based on the event detection information, and in response to receiving analysis setting information indicating an analysis content of the second travel status data, the data analysis unit changes an analysis content of the second travel status data based on the analysis setting information.

4. The travel status recording apparatus according to claim 2, in response to receiving event setting information including an event detection condition, the event detection unit changes an event detection condition based on the event detection information, and, in response to receiving analysis setting information indicating an analysis content of the second travel status data, the data analysis unit changes an analysis content of the second travel status data based on the analysis setting information.

5. A travel status recording method comprising:

acquiring first travel status data and second travel status data, the first travel status data and the second travel status data indicating a travel status in relation to a vehicle;

detecting a predetermined event that occurs in relation to the vehicle based on the first travel status data acquired;

analyzing, in response to the predetermined event being detected, the second travel status data acquired using artificial intelligence; and recording, in a storage unit, an analysis result of the acquired second travel status data in association with event detection information in relation to the predetermined event detected.

\* \* \* \* \*